J. H. KNOWLES.
Improvement in Weft-Forks for Looms.
No. 114,307.  Patented May 2, 1871.
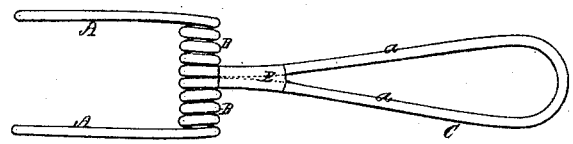
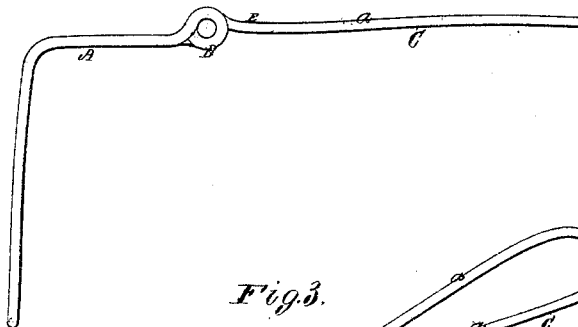
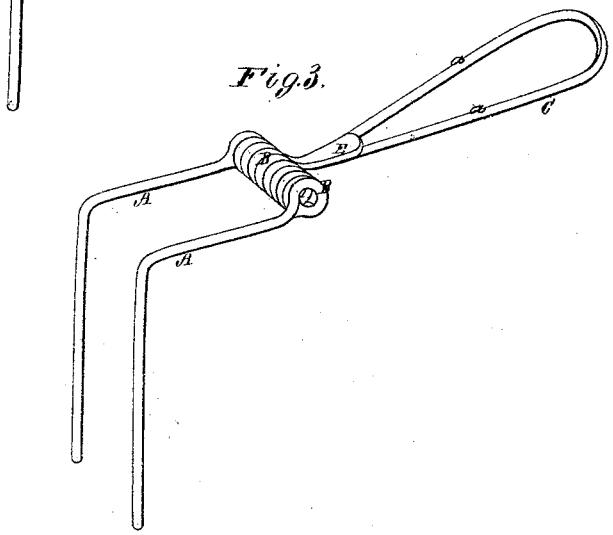
Witnesses
S. N. Piper
L. N. Möller
J. H. Knowles.
by his attorney

UNITED STATES PATENT OFFICE.

JACOB HASKELL KNOWLES, OF LAWRENCE, MASSACHUSETTS.

IMPROVEMENT IN WEFT-FORKS FOR LOOMS.

Specification forming part of Letters Patent No. 114,307, dated May 2, 1871.

*To all persons to whom these presents may come:*

Be it known that I, JACOB HASKELL KNOWLES, of Lawrence, of the county of Essex and State of Massachusetts, have invented an Improved Manufacture of Stop-Motion Fork for Looms; and I do hereby declare the same to be fully described in the following specification and represented in the accompanying drawing, of which—

Figure 1 is a top view, Fig. 2 a side elevation, and Fig. 3 a perspective view, of it.

The stop-motion fork, as mentioned by me, is composed of a single piece of wire, bent so as to form a pivoted bearing, two right-angular prongs, and a bowed or open shank, and with the parts of the shank, near their junction with the bearing helices, soldered or otherwise properly cemented together.

In the drawing, A A denote the prongs; B B, the helical bearing parts; C, the shank, and E the solder or connection of the two parts *a a* of the shank.

In making the article I take a piece of wire of a suitable length and bend it at its middle so as to bring its halves nearly in conjunction. Next I wind both of the halves around a rod or spindle, and in opposite directions, so as to form the two helical bearing parts B B. Next I bend up each of the prongs at or near its middle at a right angle, or thereabout, all being as represented. Next the parts B B are to be brought as closely together as possible, and solder, E, is to be run between the next adjacent parts of the shank, so as to connect them and keep the parts B B and their prongs in their due relations.

A stop-motion fork so made can be afforded for about one-eighth the cost of those as heretofore usually constructed and used, and, besides, it is lighter, works better, and is preferable on many accounts.

I claim as a new or improved manufacture and my invention—

The stop-motion fork made of a single piece of wire, bent substantially in manner and soldered or connected as described, all being as represented in the accompanying drawing.

JACOB HASKELL KNOWLES.

Witnesses:
  R. H. EDDY,
  J. R. SNOW.